Nov. 3, 1970  A. MIRSKY  3,538,271
TIRE PRESSURE INDICATOR WITH MERCURY SWITCHES HAVING
VERTICALLY SPACED CONTACTS
Filed Sept. 12, 1967  3 Sheets-Sheet 3

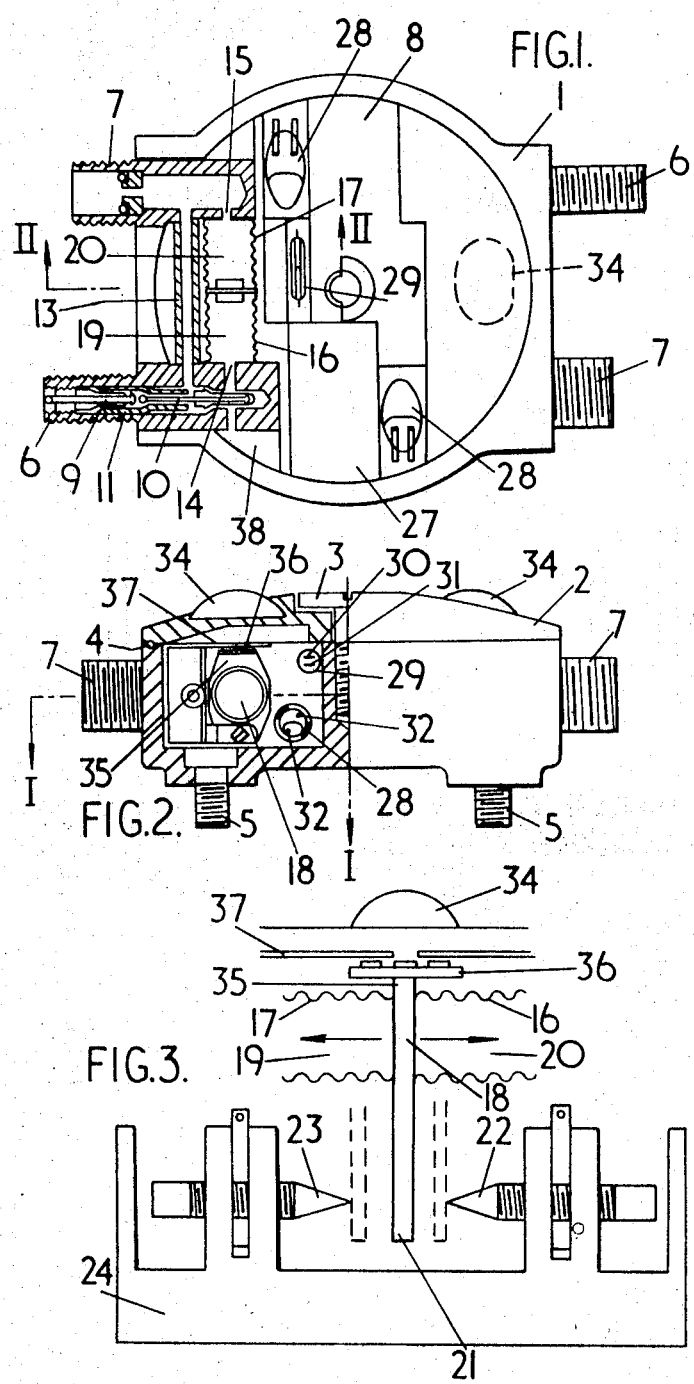

United States Patent Office 3,538,271
Patented Nov. 3, 1970

3,538,271
TIRE PRESSURE INDICATOR WITH MERCURY SWITCHES HAVING VERTICALLY SPACED CONTACTS
Alexander Mirsky, 12 Montagu Mansions, York St., London W. 1, England
Filed Sept. 12, 1967, Ser. No. 667,235
Claims priority, application Great Britain, Sept. 15, 1966, 41,334/66
Int. Cl. H01h 35/24
U.S. Cl. 200—61.25       7 Claims

ABSTRACT OF THE DISCLOSURE

Pressure indicator for a tire or other rotary component operatively associated with an electrical circuit which provides a signal according to the pressure. The indicator includes at least two centrifugal liquid conductor switches, such as mercury switches, located off the axis about which the tire rotates and spaced about said axis. When the axis is horizontal the switch contacts in the switches are not closed by the liquid electrical conductor until the tire rotates at a given predetermined speed. Once the contacts are closed on reaching the predetermined speed, the electrical circuit is energized. Means are provided for keeping the switches open when the axis of the tire is vertical and stationary. A second immiscible liquid can be included with the liquid electrical conductor for damping the movement of same.

---

In British patent specification No. 10,034/65 there is described a device responsive to the pressure of a pressurized fluid in a rotary component such as a pneumatic tire.

According to the present invention, there is provided a pressure-responsive device responsive to the pressure of a pressurized fluid in a rotating component, the pressure-responsive device having an electrical circuit for giving a signal according to said pressure and a centrifugal switching arrangement for keeping the electrical circuit open when the component is not rotating while permitting the electrical circuit to be closed when the component is rotating at a speed above the minimum speed of rotation, the centrifugal switching arrangement including at least two liquid conductor switches for location off the axis of rotation of the component and spacing about said axis, each liquid conductor switch comprising a chamber with a liquid conductor and electrical contacts in the chamber, the liquid conductor switches being connected in series and connected into said electrical circuit so that when the component rotates at a speed above said speed of rotation all the liquid conductor switches are closed. The invention extends to a rotary component on which the pressure-responsive device is mounted.

The invention is particularly applicable to vehicle pneumatic tires, though it may be used for monitoring the pressure say in a rotating hydraulic system.

Though any suitable liquid conductor may be used, mercury is especially convenient.

A second immiscible liquid may be added to the chamber for damping the oscillation and vibration of the liquid conductor and preferably also for preventing it breaking up into small fragments by influencing its surface tension. This can enable the value of said minimum speed to be lowered; thus for a vehicle wheel, the minimum speed can be lower than that corresponding to a vehicle forward speed of 5 m.p.h. (about 8 km./h.). If the liquid conductor is mercury, the second liquid is preferably a viscous liquid having an approximately constant viscosity over a wide range (say from —40° C. up to +70° C. for a tire-pressure responsive device), the viscosity being for instance between 100 and 400 poises; one suitable liquid is dimethyl-silicone. An air bubble may be included in the chamber as well as the damping liquid.

Even if the damping liquid is used, the liquid conductor will usually be heavier than the damping liquid, and the electrical contacts will thus normally be in the radially outer portions of the chambers.

Though the pressure-responsive device can work satisfactorily with only two liquid conductor switches, it may be desirable to have three, four or even more switches, depending upon factors such as the amount of liquid conductor in the switches, their exact positioning and the exact positioning of the contacts in the switch chambers. In general, the switches may be approximately equi-spaced about the axis of rotation.

The pressure-responsive device may include a radio transmitter or ultra-sonic emitter connected into said electrical circuit for giving a radio or ultra-sonic signal when said electrical circuit is energized. An electronic delay mechanism or electronic shielding may be associated with the receiver to cut out spurious signals due to for instance outside transformer stations, overhead power lines, the sparking plugs or the vehicle horn.

Further optional details of the construction of pressure-responsive means for the device and of the electrical circuit are given in patent specification No. 10,034/65 referred to above. The pressure-responsive means may include an on-off switch or for instance a ceramic pressure transducer.

The liquid conductor switches should be at as large a radius as convenient, for high sensitivity, whereas the remainder of the pressure-responsive device should be as near the axis as possible, to reduce centrifugal effects and reduce the compensation necessary for correcting the rotational inbalance. However, in the case of a vehicle tire, particularly for military purposes, the preferred arrangement is to have a pneumatically-operated switch and the centrifugal switching arrangement mounted near the wheel rim and to have a radio transmitter near the hub, the parts being connected by electrical conductors (one of which may be the wheel itself). If the pneumatically-operated switch were near the hub, it would have to be connected to the tire by a relatively lengthy hose which would normally be more susceptible to damage than an electric wire. Nonetheless, for ordinary commercial or private use, the whole device may be in a single casing mounted on the axis, i.e. on the wheel hub.

In the case, of for instance a tire, it is desirable to prevent energization of the electrical circuit even when the wheel is not in its operative position, for instance when it is lying flat during transportation.

In one embodiment at least part of the chamber of at least one liquid conductor switch, and most desirably of all the liquid conductor switches, alters in cross-section in a radial direction, at least the axially facing sides of the chamber converging towards a radially extreme portion of the chamber, each side being oppositely inclined to the median plane normal to the component axis, and the amount of liquid conductor in the chamber being such that the liquid conductor does not bridge the electrical contacts when the component is stationary with its axis vertical.

The taper need not be a strictly rectilinear taper, i.e. the sides can be curved in said cross-section. For convenience, the chamber may be generally circular in section parallel to the component axis, and said sides will then form part of a generally conical or barrel-shaped portion of the chamber.

In other embodiments, the sides need not converge, provided the contacts are positioned such that they are not bridged by the liquid conductor when the component axis is vertical; thus the contacts can be positioned such that one is substantially above the other when the arm of the component is vertical, the contacts preferably lying in a plane inclined at 45° to the horizontal.

A housing enclosing all or part of the pressure-responsive device may include a magnet-operated testing switch for testing the electrical circuit, the testing switch being positioned within the housing and arranged such that it can be actuated by a magnet held near the housing.

In this manner, it is not necessary to have a projecting operating member for the testing switch, and the intrusion of dirt or water can be avoided, as can the provision of a rubber diaphragm to prevent such intrusion. Suitable magnet-operated switches are known by the name "Reed Switches."

The pressure-responsive device may have a housing containing a member which moves as the pressure alters and having a window in the housing for viewing the member; as the movement of the member normally will be relatively small, the window may be in the form of a lens. If the operator (e.g. the pilot or driver) receives a signal, he can inspect the individual pressure-responsive devices to see which is indicating an abnormal pressure, if necessary wiping the dirt off the windows beforehand.

For precision work, for instance when testing tires a micrometer adjustment of the pressure may be incorporated, for instance using a micrometer screw to adjust the spring loading of a pressure-responsive switch.

The invention will be further described, by way of example, with reference to the accompanying drawings, in which:

FIG. 1 is a view of a device according to the invention, partly in section along the line I—I of FIG. 2, some components being omitted;

FIG. 2 shows the device of FIG. 1, partly in section along the line II—II of FIG. 1;

FIG. 3 is a detail of the pressure-responsive switch, looking in the direction III shown in FIG. 2;

Figure 4:
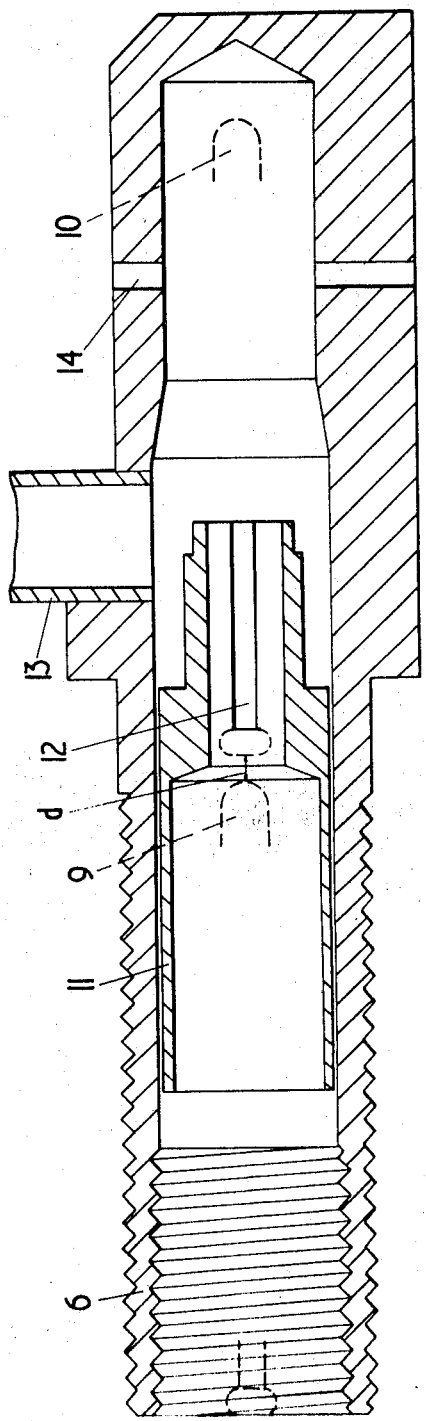
FIG. 4 is a detail of the valve unit shown in FIG. 1.

The device has a sealed casing 1, incorporating a cover 2 which is secured in position by a screw 3 and sealed by an O-ring 4. The casing 1 and cover 2 may be for instance moulded in nylon or Delrin. The cover 2 is not shown in FIG. 1. The cover will have a notch or peg for locating it correctly on the casing 1. The casing 1 has bolts 5 for fixing it to the hub of a wheel.

The device illustrated is for twin wheels on a vehicle such as a lorry or trailer. It has two inlets 6 and two outlet connections 7 for connection to the respective pneumatic tires using armored hoses. As described in more detail below, it has two switching units, but a single transmitter which is not shown but is housed in the space 8.

As shown in more detail in FIG. 4, each inlet 6 is in the form of a valve sleeve mounting two Schroeder valves 9, 10 separated by a spacing sleeve 11. The Schroeder valves are standard components, and are not illustrated in detail. The outer Schroeder valve 9 acts as a normal tire inlet valve, and controls the passage of air from the inlet 6 through the slots 12 in the spacing sleeve 11, through a connection tube 13 and to the outlet connection 7. In addition, when the stem of the outer valve 9 is depressed more than a minimum distance $d$ (shown in FIG. 4), whether through the admission of air or by manual depression of the stem, it abuts the end of the stem of the inner valve 10 and opens the inner valve, providing a connection between the connection tube 13 and the cross-bore 14 indicated in FIG. 4.

As shown in FIG. 1, the outlet connection 7 is provided on a further sleeve connected with the connection tube 13 and having a further cross-bore 15. Bellows 16, 17 are sealed to the cross-bores 14, 15, and are separated from each other by a disc 18, to provide a reference chamber 19 and a tire pressure-sensitive chamber 20.

As can be seen in FIG. 3, the disc 18 has a projection 21 lying between an overpressure contact 22 and an underpressure contact 23. The projection 21 and contacts 22, 23 form the pressure-responsive switch. As can be seen in FIG. 3, the contacts 22, 23 are carried on threaded spindles screwed into a molded block 24 which may for instance be formed of nylon.

In operation, the pressure-responsive switch and valve unit works as follows. To inflate the tire, air is supplied through the inlet 6, passing out of the outlet connection 7 into the tire; at the same time, the inner valve 10 is opened so that the pressure in both chambers 19, 20 is the same as that in the tire. When inflation ceases, both valves 9, 10 close, so that the pressure remains constant in the reference chamber 19 and acts as a reference pressure. If the tire pressure alters, the pressure in the chamber 20 will alter likewise, moving the projection 21. When a predetermined overpressure or underpressure exists, one of the contacts 22, 23 will be closed, enabling the electric circuit to be energized.

It will be noted that the pressure in the reference chamber 19 can be reset at any time by depressing the stem of the outer valve 9 for a brief moment to enable the pressures in the chambers 19, 20 to equalize.

Figure 5:
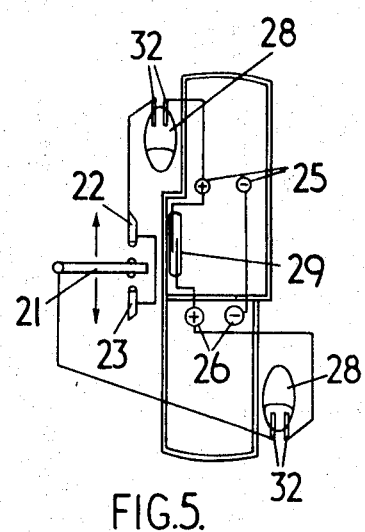
FIG. 5 is a wiring diagram for the device of FIG. 1.

FIG. 5 shows the wiring diagram, and indicates the terminals 25 for the radio transmitter and 26 for a miniaturized battery (such as a mercury cadmium cell), the battery being mounted in the space 27 indicated in FIG. 1.

The contacts 22, 23 are connected directly to each other, and the switch 21, 22, 23 is connected in series with two mercury switches 28, the battery and the transmitter, so that the transmitter transmits a signal when all the switches are closed. A reed switch 29 is mounted in parallel with the afore-mentioned switches, for testing purposes; the reed switch can be closed for testing the transmitter. Though not shown, the other pressure-sensitive switch is connected in in parallel with the pressure-sensitive switch 21, 22, 23.

The transmitter has a wire coil as an aerial; this coil is not shown, but may be molded into the casing 1 or placed in any suitable position in the device. The ground of the transmitter is connected to the vehicle via the fixing bolts 5.

As shown in FIG. 2, the reed switch 29 has a fixed contact 30 and a ferro-magnetic movable contact 31. The reed switch 29 is closed, and the transmitter 8 tested, by bringing a magnet up to the cover 2.

As illustrated in FIGS. 1, 2 and 5, each mercury switch 28 has a barrel-shaped casing, preferably made of glass, containing mercury with dimethyl-silicone and, if desired, a small air bubble. The dimethyl-silicone acts as a damping liquid, and has a viscosity in the range of 100 to 400 poises in the temperature range of $-40°$ C. to $+70°$ C. As can be seen from FIGS. 1 and 5, the mercury switches 28 are mounted diametrically opposite each other with their contacts 32 at their radially outer portions. As can be seen from FIG. 2, the contacts 32 are positioned so that one is substantially above the other when the axis of the wheel is vertical, the contacts of 32 of each individual switch then lying in a plane at 45° to the horizontal.

The arrangement of the mercury switches 28 is such that both switches will be closed when the wheel is rotating at a speed above a minimum speed; this minimum speed will depend on various factors such as the radius of the wheel, but may for instance correspond to a vehicle forward speed of 5 m.p.h. As can be seen from FIG. 2, neither of the mercury switches 32 is closed when the axis of the wheel is vertical.

Figure 6:
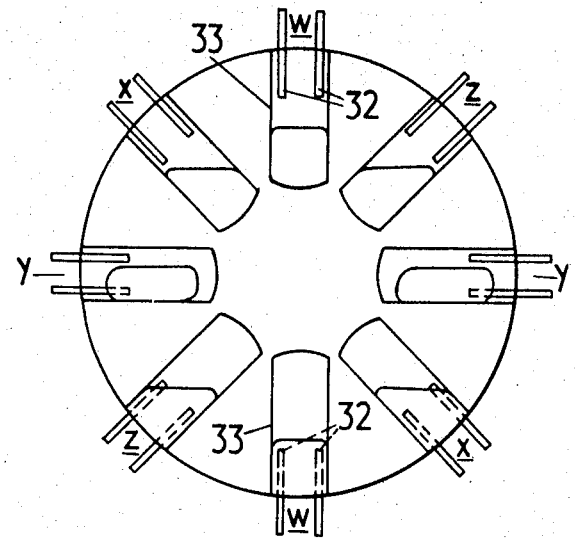
FIG. 6 shows a modified shape of mercury switch, and illustrates the operation of the mercury switches.

FIG. 6 illustrates a modified mercury switch 33, and also illustrates how at least one of the mercury switches 33 is open at whatever position the wheel stops. The four positions are labelled as w, x, y and z. The positioning of the contacts 32 in the switches 33 is exactly the same as in the switches 28. However, the switches 33 are formed of square-section tubing. The advantage of using square-section tubing is that the exact positioning of the contacts 32 is more easily obtained when the switches are installed in the casing 1.

As shown in FIG. 2, two lens windows 34 are provided in the cover 2. These windows may be formed in glass or acrylic resin, and may be molded in position when the cover 2 is molded. As shown in FIGS. 2 and 3 the disc 18 also has an upper projection 35 carrying a small platform 36 which lies beneath the window 34. The platform 36 can carry markings indicating the pressure in the tire, so that the condition of the tire can be quickly assessed. One suitable arrangement is to provide a screen 37 above the platform 36, with a slit in the screen immediately below the window 34. The platform 36 can carry three colours, one of which is visible through the slit, indicating whether the pressure is normal, too high or too low.

In the arrangement illustrated, the overpressure contact 22 is closed at about the same percentage pressure differential as the underpressure contact 23 is closed. To improve the operation of the reference chamber 19, the cross-bore 14 also communicates with an additional volume 38 (see FIG. 1).

In other arrangements, the setting of the switch may be for instance that a signal is given at 10-15% below normal operating pressure, and perhaps 15-25% above normal operating pressure. The first signal would occur when the tire is deflated or when the tire temperature had dropped considerably (e.g. due to a considerable drop in ambient temperature) and the second signal would occur when the tire became overheated through excessive stress or due to a great increase in the ambient temperature. The indication of 15-25% overpressure would normally provide a sufficient safety margin against failure of the type of rubber.

It is understood that the driver or pilot of the vehicle will have a receiver and an indicator for indicating when the transmitter gives a signal.

I claim:
1. On a rotary component rotatable about a generally horizontal axis, a pressure-responsive device responsive to the pressure of a pressurized fluid in the rotary component, the pressure-responsive device comprising
an electrical circuit for giving a signal according to said pressure,
at least two centrifugal liquid conductor switch chambers located off the said axis and spaced about said axis,
electrical switch contacts in each switch chamber,
a liquid electrical conductor in each switch chamber, whereby when the axis of the rotary component is generally horizontal, the liquid conductor switch contacts are not closed if the rotary component is stationary or rotating at a speed below a minimum speed of rotation and the liquid conductor switch contacts are closed if the rotary component is rotating at a speed above said minimum speed of rotation,
electrical conductors connecting the liquid conductor switches in series and to said electrical circuit, and
means keeping the liquid conductor switch chambers open when the axis of the rotary component is vertical and the rotary component is stationary.

2. A pressure-responsive device as claimed in claim 1, wherein the switch chambers contain a second immiscible liquid for damping the movement of the liquid conductor.

3. A pressure-responsive device as claimed in claim 1, wherein at least part of each switch chamber alters in cross-section in a radial plane, at least the axially-facing sides of the chamber converging towards a radially extreme portion of the chamber, each side being oppositely inclined to the median plane normal to the component axis.

4. A pressure responsive device as claimed in claim 3, wherein each switch chamber is generally circular in section parallel to the component axis and wherein said sides form part of a generally conical or barrel-shaped portion of the chamber.

5. A pressure-responsive device as claimed in claim 1, wherein one said electrical switch contact in each switch chamber is substantially above the other when said axis is vertical.

6. A pressure-responsive device as claimed in claim 5, wherein the electrical contacts in each respective switch chamber lie in a plane inclined at an angle of approximately 45° to the horizontal when said axis is vertical.

7. A pressure-response device as claimed in claim 1 and having a housing enclosing at least part of the pressure-responsive device, the housing containing a magnet-operated testing switch for testing the electrical circuit, which testing switch is actuable by a magnet held near the housing.

References Cited
UNITED STATES PATENTS

| | | | |
|---|---|---|---|
| 2,504,381 | 4/1950 | Bordelon | 200—167 X |
| 2,934,354 | 4/1960 | Vogel | 200—152 X |
| 3,104,289 | 9/1963 | Segel | 335—205 X |
| 3,208,425 | 9/1965 | Jousma et al. | 116—34 |
| 3,250,868 | 5/1966 | Worth. | |
| 3,297,984 | 1/1967 | Necker | 340—58 |
| 3,430,196 | 2/1969 | Dalton | 200—61.25 X |

FOREIGN PATENTS 340,880   5/1936   Italy.

OTHER REFERENCES

"Science & Invention," p. 40, September 1928 issue.

ROBERT K. SCHAEFER, Primary Examiner

R. A. VANDERHYE, Assistant Examiner

U.S. Cl. X.R.

200—80, 152; 340—58